US012776668B1

(12) United States Patent
Chan

(10) Patent No.: US 12,776,668 B1
(45) Date of Patent: Oct. 27, 2026

(54) INDUCTIVE POWER SUPPLY AND METALLIC FOREIGN OBJECT DETECTION METHOD THEREOF

(71) Applicant: Delta Electronics, Inc., Taoyuan City (TW)

(72) Inventor: Chi-Che Chan, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 0 days.

(21) Appl. No.: 19/248,311

(22) Filed: Jun. 24, 2025

(30) Foreign Application Priority Data

Apr. 28, 2025 (CN) ......................... 202510544963.6

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .................................. H02J 50/60; H02J 50/12
USPC ........................................................ 307/104
See application file for complete search history.

(56) References Cited

U.S. PATENT DOCUMENTS 7,212,414 B2 * 5/2007 Baarman .................. A61L 2/10 363/16
7,952,322 B2 * 5/2011 Partovi .................. H01F 38/14 320/108
10,958,106 B2 * 3/2021 Matsuda ................ H02J 50/10
2011/0050164 A1 * 3/2011 Partovi .................. H01F 38/14 320/108
2014/0077615 A1 3/2014 Stevens et al.
2015/0091387 A1 4/2015 Okazaki
2018/0019618 A1 * 1/2018 Ikefuji ...................... H02J 7/00
2018/0102677 A1 * 4/2018 Tsai ........................ H02J 50/12
2018/0145541 A1 5/2018 Taya
2018/0316227 A1 * 11/2018 Tsai ........................ H02J 50/80

(Continued)

FOREIGN PATENT DOCUMENTS

CN 105449875 B 9/2018
CN 109143386 A 1/2019
CN 115428298 A 12/2022

(Continued)

*Primary Examiner* — Alfonso Perez Borroto
(74) *Attorney, Agent, or Firm* — KIRTON McCONKIE; Evan R. Witt

(57) ABSTRACT

An inductive power supply and a metallic foreign object detection method thereof are provided. The inductive power supply includes a power transmitting portion including a power transmitting coil, a first driving module, a second driving module, a controller, and a first signal processor. The controller is configured to perform a first detection mode, in which the controller drives the first switch circuit through the first driving signal, controls the second switch circuit to remain in an off state through the second driving signal, and obtains the first resonant signal generated by resonance of the first capacitor and the power transmitting coil through the first signal processor. When a difference between any two consecutive peak values of the first resonant signal is greater than a reference difference, the controller is configured to determine that a metallic foreign object is present within a power transmission range of the power transmitting portion.

16 Claims, 6 Drawing Sheets

(56) References Cited

U.S. PATENT DOCUMENTS

| | | | |
|---|---|---|---|
| 2019/0013701 | A1 | 1/2019 | Tsai et al. |
| 2023/0163636 | A1 | 5/2023 | Tsai et al. |

FOREIGN PATENT DOCUMENTS

| | | | |
|---|---|---|---|
| CN | 110168860 | B | 5/2023 |
| CN | 111585359 | B | 11/2024 |
| TW | 201315082 | A | 4/2013 |
| TW | I839868 | B | 4/2024 |
| TW | 202429798 | A | 7/2024 |

* cited by examiner

INDUCTIVE POWER SUPPLY AND METALLIC FOREIGN OBJECT DETECTION METHOD THEREOF

CROSS-REFERENCE TO RELATED APPLICATION

This application claims priority to China Patent Application No. 202510544963.6, filed on Apr. 28, 2025, and the entire contents of which are incorporated herein by reference for all purposes.

FIELD OF THE INVENTION

The present disclosure relates to an inductive power supply and a metallic foreign object detection method thereof, and more particularly to an inductive power supply and a metallic foreign object detection method thereof capable of performing power transmission and foreign object detection simultaneously.

BACKGROUND OF THE INVENTION

In inductive power supplies (e.g., wireless chargers that transmit energy via coil induction), foreign object detection (FOD) is an important safety mechanism used to detect the presence of metallic foreign objects around the power transmitting coil of the power transmitting portion of the inductive power supply. When the power transmitting coil of the power transmitting portion transmits power to the power receiving module, metallic foreign objects near the coil can interfere with power transmission. These objects may rapidly heat up, posing safety risks.

One conventional detection method is power difference detection, in which the transmitted power of the transmitting portion is detected and compared with a predetermined power value to determine whether a metallic foreign object is present around the power transmitting coil. However, this method can only identify the presence of a metallic foreign object when the power difference between the transmitted power and the predetermined power value is significant. If the power difference is small, it would be unable to identify the presence of a metallic foreign object, resulting in lower detection accuracy. Another conventional detection method involves interrupting the driver and measuring the attenuation of the resonance signal during this period to determine whether a metallic foreign object is present. However, this method requires pausing the driver, and thus power transmission cannot be performed simultaneously during the detection process.

Therefore, there is a need of providing an inductive power supply and a metallic foreign object detection method thereof in order to overcome the drawbacks of the conventional technologies.

SUMMARY OF THE INVENTION

The present disclosure provides an inductive power supply and a metallic foreign object detection method thereof. In power transmitting portion of the inductive power supply, part of drivers is temporarily halted, the resonant signal is detected, and whether there is a metallic foreign object within the power transmission range of the power transmitting portion according to the resonant signal. Meanwhile, the other drivers in the power transmitting portion continue to operate so that the power transmitting portion can transmit power to the power receiving portion continuously.

In accordance with an aspect of the present disclosure, an inductive power supply is provided. The inductive power supply includes a power transmitting portion and a power receiving portion. The power transmitting portion is connected to a power source and is configured to transmit power to the power receiving portion, and the power transmitting portion includes a power transmitting coil, a first driving module, a second driving module, a controller, and a first signal processor. The power transmitting coil has a first node and a second node at two ends thereof respectively. The first driving module includes a first capacitor, a first switch circuit and a first driver. The first switch circuit is connected to the power source and is electrically connected between the first capacitor and the first driver, and the first capacitor is further electrically connected to the first node. The second driving module is electrically connected in parallel to the first driving module, and includes a second capacitor, a second switch circuit and a second driver. The second switch circuit is connected to the power source and is electrically connected between the second capacitor and the second driver, and the second capacitor is further electrically connected to the first node. The controller is electrically connected to the first driving module and the second driving module, and is configured to provide a first driving signal and a second driving signal to the first driver and the second driver respectively. The first driver is configured to drive the first switch circuit according to the first driving signal, and the second driver is configured to drive the second switch circuit according to the second driving signal. The first signal processor is electrically connected to the first node and the controller, and is configured to acquire a first resonant signal from the first node. The controller is configured to perform a first detection mode, in which the controller drives the first switch circuit through the first driving signal, controls the second switch circuit to remain in an off state through the second driving signal, and obtains the first resonant signal generated by resonance of the first capacitor and the power transmitting coil through the first signal processor. When a difference between any two consecutive peak values of the first resonant signal is greater than a reference difference, the controller is configured to determine that a metallic foreign object is present within a power transmission range of the power transmitting portion.

In accordance with another aspect of the present disclosure, a metallic foreign object detection method of an inductive power supply is provided. The metallic foreign object detection method includes steps of: (a) providing a power transmitting portion and a power receiving portion, wherein the power transmitting portion is connected to a power source and is configured to transmit power to the power receiving portion, the power transmitting portion comprises a power transmitting coil, a first driving module, a second driving module, a controller and a first signal processor, the first driving module comprises a first capacitor, a first switch circuit and a first driver, the power transmitting coil has a first node and a second node at two ends thereof respectively, the first switch circuit is electrically connected to the power source and is electrically connected between the first capacitor and the first driver, the first capacitor is further electrically connected to the first node, the second driving module is electrically connected in parallel to the first driving module and comprises a second capacitor, a second switch circuit and a second driver, the second switch circuit is electrically connected to the power source and is electrically connected between the second capacitor and the second driver, the second capacitor is further electrically connected to the first node, the controller is electrically connected to the first and second driving modules, and the first signal processor is electrically connected to the first node and the controller and is configured to acquire a first resonant signal from the first node; (b) providing a first driving signal and a second driving signal to the first driver and the second driver respectively by the controller, driving the first switch circuit according to the first driving signal by the first driver, and driving the second switch circuit according to the second driving signal by the second driver; (c) controlling the controller to perform a first detection mode, in which the controller drives the first switch circuit through the first driving signal, controls the second switch circuit to remain in an off state through the second driving signal, and obtains the first resonant signal generated by resonance of the first capacitor and the power transmitting coil through the first signal processor; and (d) when a difference between any two consecutive peak values of the first resonant signal obtained in the first detection mode is greater than a reference difference, determining that a metallic foreign object is present within a power transmission range of the power transmitting portion by the controller.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
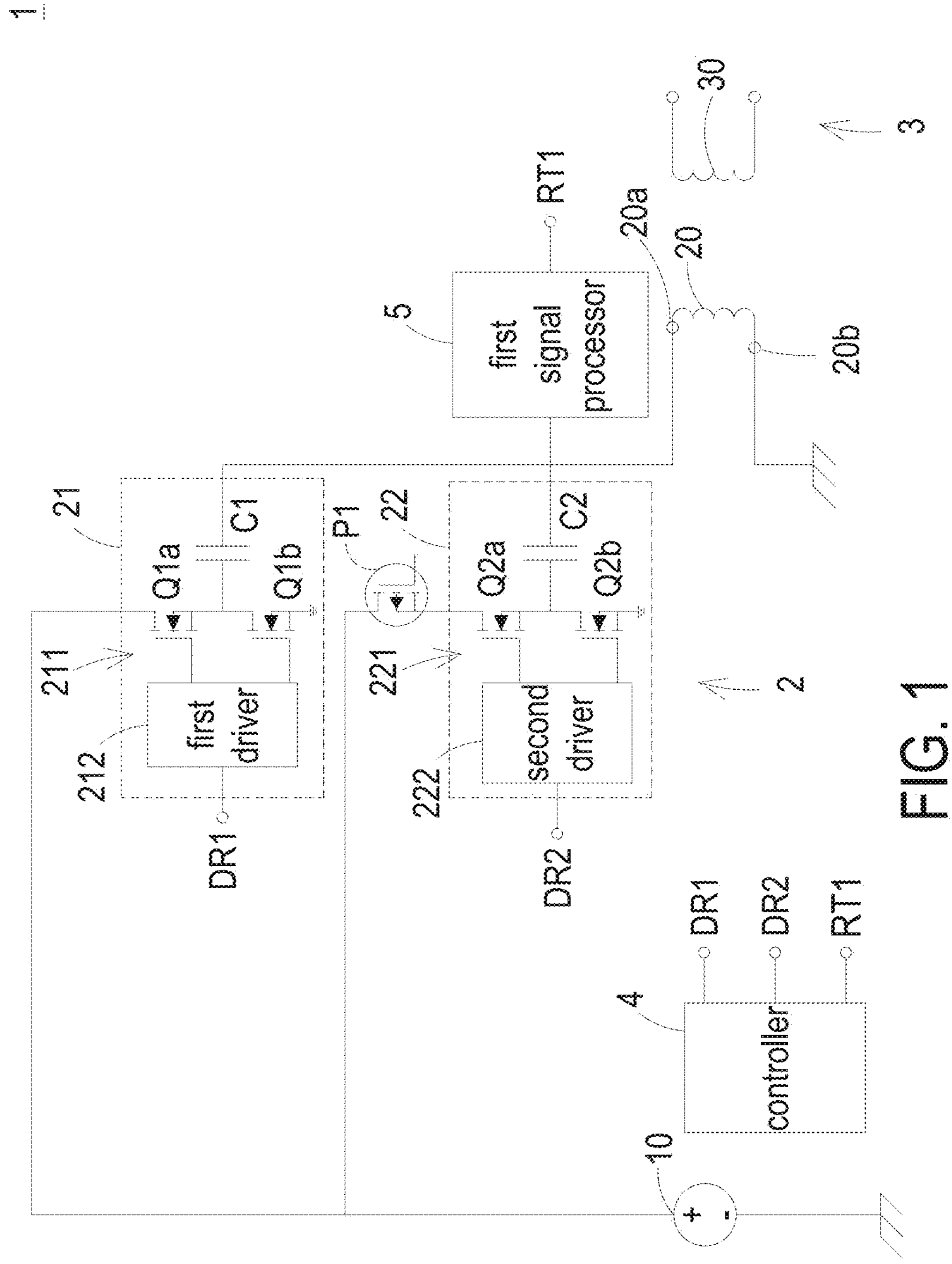
FIG. 1 is a schematic circuit diagram illustrating an inductive power supply 1 according to a first embodiment of the present disclosure.

FIG. 1 is a schematic circuit diagram illustrating an inductive power supply 1 according to a first embodiment of the present disclosure. As shown in FIG. 1, the inductive power supply 1 includes a power transmitting portion 2 and a power receiving portion 3. The power transmitting portion 2 is electrically connected to a power source 10 and is configured to transmit power to the power receiving portion 3. The power transmitting portion 2 includes a power transmitting coil 20, a first driving module 21, a second driving module 22, a controller 4, and a first signal processor 5. The power transmitting coil 20 has a first node 20*a* and a second node 20*b* at its two ends respectively. In an embodiment, the second node 20*b* is grounded. The power receiving portion 3 includes a power receiving coil 30. The power transmitting coil 20 and the power receiving coil 30 are electromagnetically coupled to each other and are used for power transmission. For simplicity, only the power receiving coil 30 of the power receiving portion 3 is shown in FIG. 1. However, it is noted that the specific circuit structure of the power receiving portion 3 may be configured according to actual requirements and is not limited in the present disclosure.

In the power transmitting portion 2 of the inductive power supply 1, the first driving module 21 includes a first capacitor C1, a first switch circuit 211, and a first driver 212. The first switch circuit 211 is electrically connected to the power source 10 and is electrically connected between the first capacitor C1 and the first driver 212. The first capacitor C1 is further electrically connected to the first node 20*a*. The first driver 212 is configured to drive the first switch circuit 211. The first capacitor C1 is in different potential states according to the switching operation of the first switch circuit 211.

The second driving module 22 is electrically connected in parallel to the first driving module 21, and the second driving module 22 includes a second capacitor C2, a second switch circuit 221, and a second driver 222. The second switch circuit 221 is electrically connected to the power source 10 and is electrically connected between the second capacitor C2 and the second driver 222. The second capacitor C2 is further electrically connected to the first node 20*a*. The second driver 222 is configured to drive the second switch circuit 221. The second capacitor C2 is in different potential states according to the switching operation of the second switch circuit 221.

The controller 4 is electrically connected to the first driving module 21 and the second driving module 22, and provides a first driving signal DR1 and a second driving signal DR2 to the first driver 212 of the first driving module 21 and the second driver 222 of the second driving module 22 respectively. The first driver 212 drives the first switch circuit 211 according to the first driving signal DR1, and the second driver 222 drives the second switch circuit 221 according to the second driving signal DR2. The first driving signal DR1 and the second driving signal DR2 may be pulse width modulation signals, but not limited thereto. The first signal processor 5 is electrically connected to the first node 20*a* of the power transmitting coil 20 and the controller 4, and is configured to acquire a first resonant signal RT1 from the first node 20*a* and provide the acquired first resonant signal RT1 to the controller 4. The first signal processor 5 may adopt a suitable signal processor according to actual requirements, and the specific implementation of the first signal processor 5 is not limited in the present disclosure. For example, the first signal processor 5 may include an analog-to-digital converter, which converts the first resonant signal RT1 into digital form and provides it to the controller 4.

Figure 2:
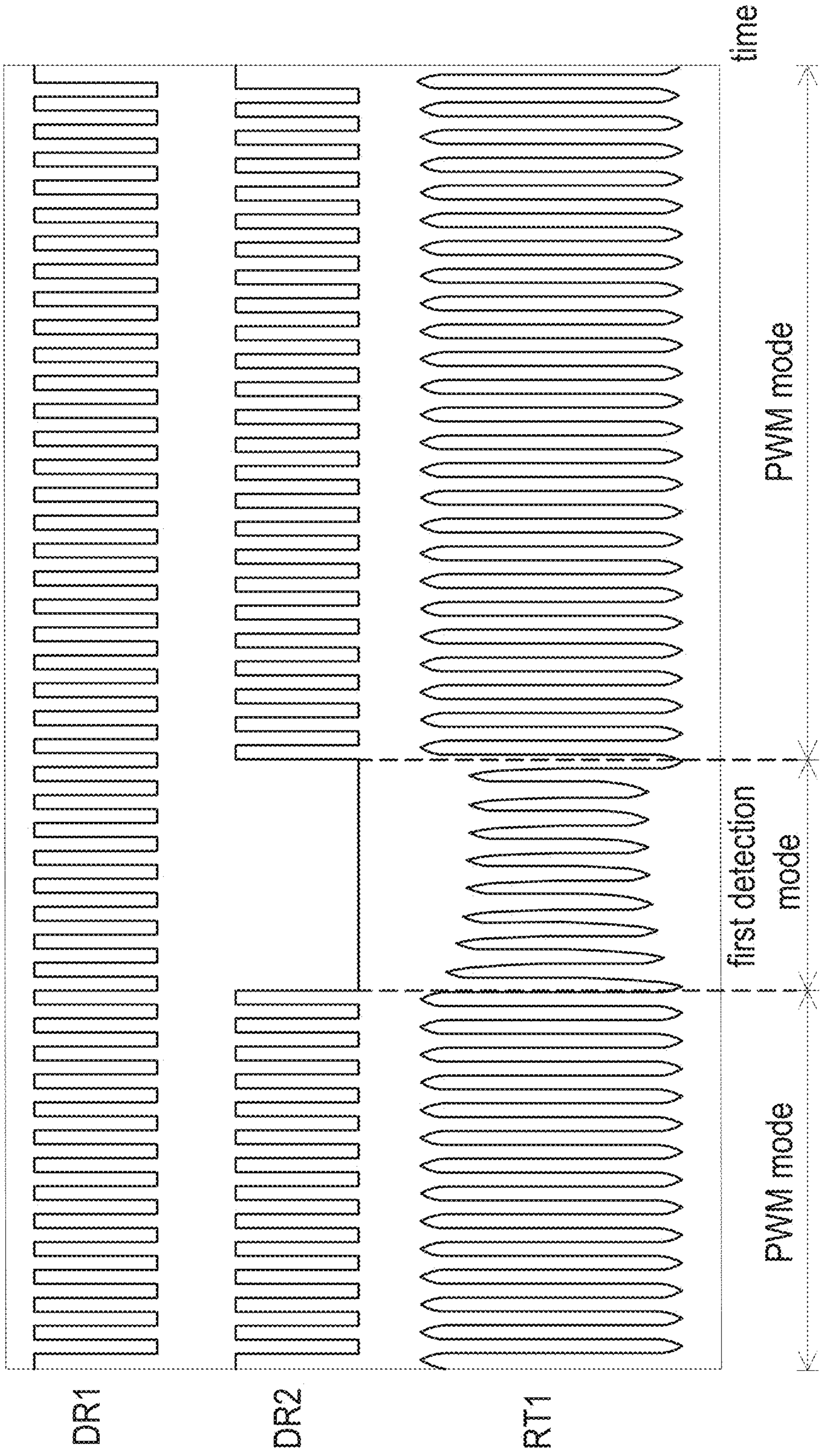
FIG. 2 schematically shows the first driving signal, the second driving signal, and the first resonant signal of the inductive power supply shown in FIG. 1.

The controller 4 is configured to perform a PWM (pulse width modulation) mode and a first detection mode, which would be described in detail as follows. Please refer to FIG. 2 in conjunction with FIG. 1. FIG. 2 schematically shows the first driving signal DR1, the second driving signal DR2, and the first resonant signal RT1 of the inductive power supply 1 shown in FIG. 1. As shown in FIG. 1 and FIG. 2, in the PWM mode, the controller 4 controls the first switch circuit 211 and the second switch circuit 221 to operate normally through the first driving signal DR1 and the second driving signal DR2 respectively. Namely, the switches in the first switch circuit 211 and the second switch circuit 221 respectively switch according to the first driving signal DR1 and the second driving signal DR2, such that the electric energy supplied by the power source 10 is transmitted to the power transmitting coil 20 through the first switch circuit 211 and the second switch circuit 221 respectively. In the PWM mode, the power transmitting portion 2 transmits power to the power receiving portion 3, and the first resonant signal RT1 is generated by the resonance of the first capacitor C1, the second capacitor C2, and the power transmitting coil 20.

In the first detection mode, the controller 4 controls the first switch circuit 211 to operate normally through the first driving signal DR1, and controls the second switch circuit 221 to remain in the off state through the second driving signal DR2. Since the first switch circuit 211 operates normally, the electric energy supplied by the power source 10 is transmitted to the power transmitting coil 20 through the first switch circuit 211. Therefore, the power transmitting portion 2 still transmits power to the power receiving portion 3. In addition, since the second switch circuit 221 remains in the off state, the second capacitor C2 does not participate in the resonance, and thus the first resonant signal RT1 is generated by the resonance of the first capacitor C1 and the power transmitting coil 20 at this time.

When a metallic foreign object is present within the power transmission range of the power transmitting portion 2, the waveform of the first resonant signal RT1 exhibits rapid attenuation due to the influence of the metallic foreign object. Accordingly, according to the first resonant signal RT1 obtained in the first detection mode, the controller 4 can determine whether a metallic foreign object is present within the power transmission range of the power transmitting portion 2. Specifically, in the first detection mode, when the difference between two peak values in any two consecutive cycles of the first resonant signal RT1 is greater than a reference difference, the controller 4 determines that a metallic foreign object is present within the power transmission range of the power transmitting portion 2. When the controller 4 determines that there is no metallic foreign object within the power transmission range of the power transmitting portion 2, the controller 4 performs the PWM mode again. Conversely, when the controller 4 determines that a metallic foreign object is present within the power transmission range of the power transmitting portion 2, the controller 4 controls the power transmitting portion 2 to stop transmitting power to the power receiving portion 3. Namely, the controller 4 controls both the first switch circuit 211 and the second switch circuit 221 to be in the off state through the first driving signal DR1 and the second driving signal DR2.

Accordingly, in the present disclosure, whether a metallic foreign object is present within the power transmission range of the power transmitting portion 2 can be determined according to the first resonant signal RT1 obtained in the first detection mode, and the power transmitting portion 2 can still continue transmitting power to the power receiving portion 3 in the first detection mode. In other words, the present disclosure is capable of detecting metallic foreign objects while maintaining power transmission. Moreover, the present disclosure can utilize the same power transmitting coil to simultaneously perform metallic foreign object detection and power transmission, without the need to additionally dispose a coil for metallic foreign object detection.

The circuit structure and operating principle of the first switch circuit 211 and the second switch circuit 221 are described in detail as follows.

Please refer to FIG. 1 again. The first switch circuit 211 includes a first upper switch Q1*a* and a first lower switch Q1*b* electrically connected in series. The first upper switch Q1*a* and the first lower switch Q1*b* are for example but not limited to N-channel enhancement mode MOSFETs (metal-oxide-semiconductor field-effect transistors). The gate and drain of the first upper switch Q1*a* are electrically connected to the first driver 212 and the power source 10, respectively. The source of the first upper switch Q1*a* is electrically connected to the drain of the first lower switch Q1*b*. The gate of the first lower switch Q1*b* is electrically connected to the first driver 212, and the source of the first lower switch Q1*b* is grounded. The first terminal of the first capacitor C1 is electrically connected to the source of the first upper switch Q1*a* and the drain of the first lower switch Q1*b*. The second terminal of the first capacitor C1 is electrically connected to the first node 20*a*.

The second switch circuit 221 includes a second upper switch Q2*a* and a second lower switch Q2*b* electrically connected in series. The second upper switch Q2*a* and the second lower switch Q2*b* are for example but not limited to N-channel enhancement mode MOSFETs. The gate and drain of the second upper switch Q2*a* are electrically connected to the second driver 222 and the power source 10, respectively. The source of the second upper switch Q2*a* is electrically connected to the drain of the second lower switch Q2*b*. The gate of the second lower switch Q2*b* is electrically connected to the second driver 222, and the source of the second lower switch Q2*b* is grounded. The first terminal of the second capacitor C2 is electrically connected to the source of the second upper switch Q2*a* and the drain of the second lower switch Q2*b*. The second terminal of the second capacitor C2 is electrically connected to the first node 20*a*.

When the first upper switch Q1*a* is turned on and the first lower switch Q1*b* is turned off, the first capacitor C1 is in a high potential state. When the first upper switch Q1*a* is turned off and the first lower switch Q1*b* is turned on, the first capacitor C1 is in a low potential state. When both the first upper switch Q1*a* and the first lower switch Q1*b* are turned off, the first capacitor C1 is in a high-impedance floating state. Similarly, when the second upper switch Q2*a* is turned on and the second lower switch Q2*b* is turned off, the second capacitor C2 is in a high potential state. When the second upper switch Q2*a* is turned off and the second lower switch Q2*b* is turned on, the second capacitor C2 is in a low potential state. When both the second upper switch Q2*a* and the second lower switch Q2*b* are turned off, the second capacitor C2 is in a high-impedance floating state.

Additionally, in the first detection mode, when the second switch circuit 221 is in the off state (i.e., when both the second upper switch Q2*a* and the second lower switch Q2*b* of the second switch circuit 221 are turned off), the second capacitor C2 and the second lower switch Q2*b* form a clamping circuit that clamps the first resonant signal RT1, which may result in current flowing back to the power source 10 from the first node 20*a*. For this reason, in an embodiment, the power transmitting portion 2 of the inductive power supply 1 further includes a first blocking switch P1. The first blocking switch P1 is electrically connected between the second upper switch Q2*a* and the power source 10, and is controlled by the controller 4. The first blocking switch P1 is configured to block the current from flowing back to the power source 10 from the first node 20*a*. In the embodiment shown in FIG. 1, the first blocking switch P1 is a P-channel MOSFET, but the present disclosure is not limited thereto. In another embodiment, the first blocking switch P1 may be a diode.

Please refer to FIG. 1 and FIG. 2. In the PWM mode, the controller 4 controls the first upper switch Q1*a* and the first lower switch Q1*b* of the first switch circuit 211 to turn on alternately, controls the second upper switch Q2*a* and the second lower switch Q2*b* of the second switch circuit 221 to turn on alternately, and controls the first blocking switch P1 to turn on. In the first detection mode, the controller 4 controls the first upper switch Q1*a* and the first lower switch Q1*b* of the first switch circuit 211 to turn on alternately, controls both the second upper switch Q2*a* and the second lower switch Q2*b* of the second switch circuit 221 to turn off, and controls the first blocking switch P1 to turn off to prevent reverse current.

In addition, it is noted that in the conventional technologies, all driving operations in the inductive power supply must be interrupted (i.e., the power transmission is stopped) during the metallic foreign object detection, resulting in inconsistency in the frequency of the resonant signal before and after the interruption, which makes it difficult to sample the peak value of the resonant signal. While in the present disclosure, during the metallic foreign object detection, only part of the driving operations is interrupted, and the power transmission is continued. Consequently, the frequency of the first resonant signal RT1 can remain consistent in both the PWM mode and the first detection mode. Accordingly, the peak value of the first resonant signal RT1 can be accurately sampled during the first detection mode, thereby improving the accuracy of sampling the peak value of the first resonant signal RT1. Furthermore, during the process of mode switching (e.g., switching from the PWM mode to the first detection mode, or vice versa), the frequency of the first resonant signal RT1 remains consistent, thereby avoiding the problem of current surge.

Additionally, in the embodiment shown in FIG. 1, the inductive power supply 1 includes one second driving module 22. However, in practice, the number of second driving modules 22 is not limited. For example, in an embodiment, the inductive power supply 1 includes a plurality of second driving modules 22 electrically connected in parallel so as to improve the efficiency and power of power transmission. Moreover, in an embodiment, under the circumstance that the inductive power supply 1 includes a plurality of second driving modules 22, the inductive power supply 1 correspondingly includes a plurality of first blocking switches P1. Each first blocking switch P1 is electrically connected between the power source 10 and the corresponding second driving module 22, and is configured to prevent current from flowing back to the power source 10 through the corresponding second driving module 22.

In the above embodiments, the power transmitting portion 2 of the inductive power supply 1 adopts a half-bridge configuration. However, the present disclosure is not limited thereto. For example, the power transmitting portion 2 of the inductive power supply may adopt a full-bridge configuration, as described in detail below.

Figure 3:
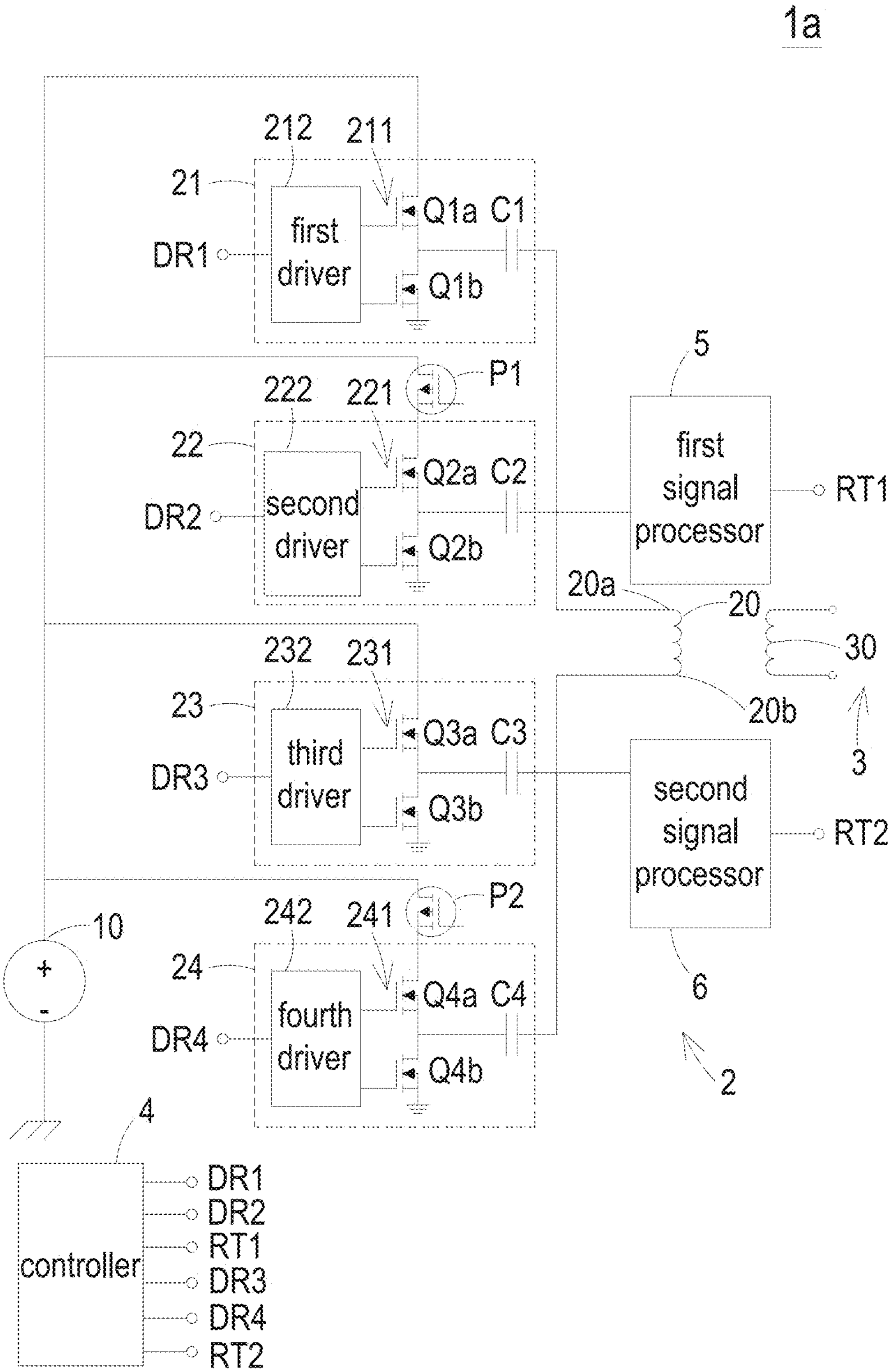
FIG. 3 is a schematic diagram illustrating an inductive power supply 1*a* according to a second embodiment of the present disclosure.

Please refer to FIG. 3. FIG. 3 is a schematic diagram illustrating an inductive power supply 1*a* according to a second embodiment of the present disclosure. In FIG. 3, the component parts and elements corresponding to those of FIG. 1 are designated by identical numeral references, and detailed descriptions thereof are omitted herein. In this embodiment, the power transmitting portion 2 of the inductive power supply 1*a* further includes a third driving module 23, a fourth driving module 24, and a second signal processor 6. The third driving module 23 includes a third capacitor C3, a third switch circuit 231, and a third driver 232. The third switch circuit 231 is electrically connected to the power source 10 and is electrically connected between the third capacitor C3 and the third driver 232. The third capacitor C3 is further electrically connected to the second node 20*b*. The third driver 232 is configured to drive the third switch circuit 231. The third capacitor C3 is in different potential states according to the switching operation of the third switch circuit 231.

The fourth driving module 24 is electrically connected in parallel to the third driving module 23. The fourth driving module 24 includes a fourth capacitor C4, a fourth switch circuit 241, and a fourth driver 242. The fourth switch circuit 241 is electrically connected to the power source 10 and is electrically connected between the fourth capacitor C4 and the fourth driver 242. The fourth capacitor C4 is further electrically connected to the second node 20*b*. The fourth driver 242 is configured to drive the fourth switch circuit 241. The fourth capacitor C4 is in different potential states according to the switching operation of the fourth switch circuit 241.

The controller 4 is further electrically connected to the third driving module 23 and the fourth driving module 24, and provides a third driving signal DR3 and a fourth driving signal DR4 to the third driver 232 of the third driving module 23 and the fourth driver 242 of the fourth driving module 24 respectively. The third driver 232 drives the third switch circuit 231 according to the third driving signal DR3. The fourth driver 242 drives the fourth switch circuit 241 according to the fourth driving signal DR4. The third driving signal DR3 and the fourth driving signal DR4 may be pulse width modulation signals, but not limited thereto. The second signal processor 6 is electrically connected to the second node 20*b* of the power transmitting coil 20 and the controller 4, and is configured to acquire a second resonant signal RT2 from the second node 20*b* and provide the acquired second resonant signal RT2 to the controller 4. The second signal processor 6 may adopt a suitable signal processor according to actual requirements, and the specific implementation of the second signal processor 6 is not limited in the present disclosure. For example, the second signal processor 6 may include an analog-to-digital converter, which converts the second resonant signal RT2 into digital form and provides it to the controller 4.

Figure 4:
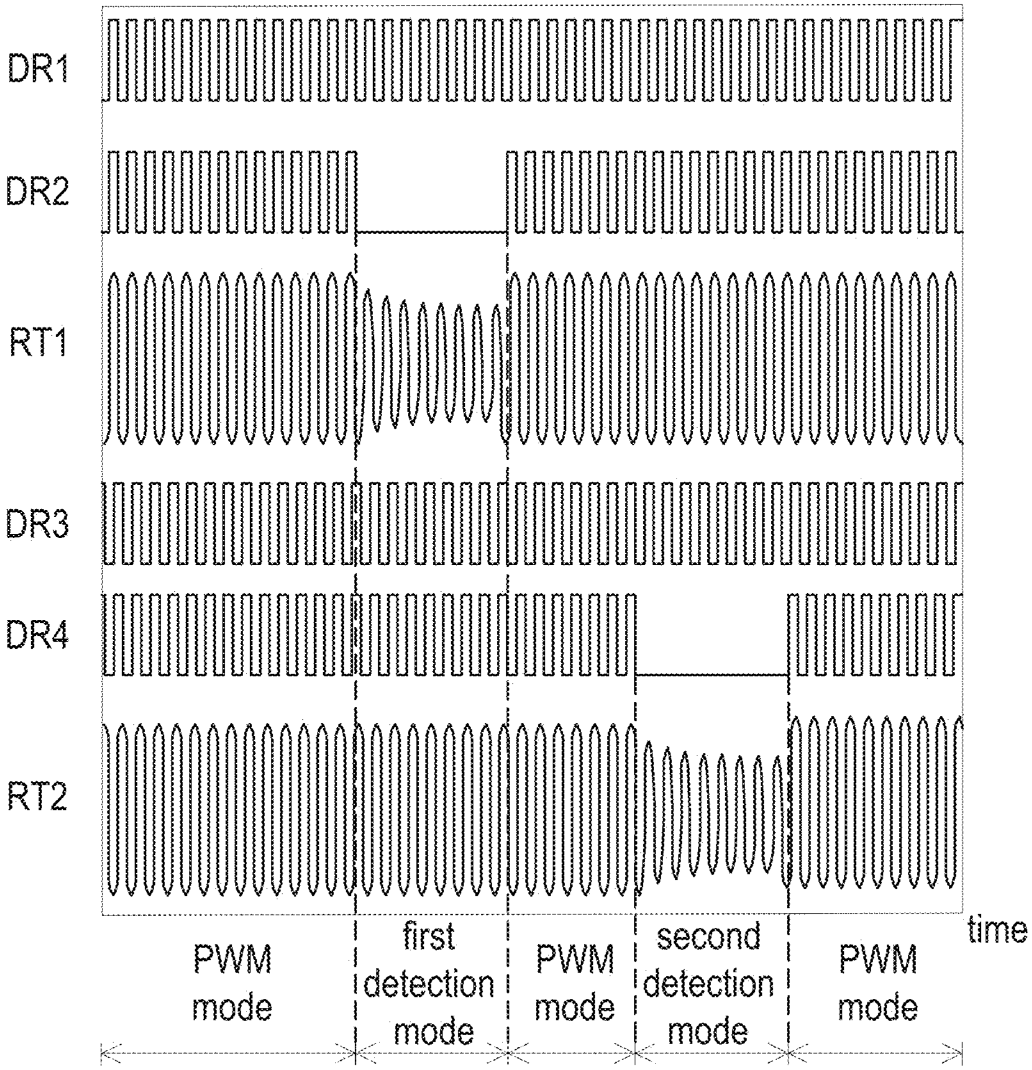
FIG. 4 schematically shows the first driving signal, the second driving signal, the first resonant signal, the third driving signal, the fourth driving signal, and the second resonant signal of the inductive power supply shown in FIG. 3.

In this embodiment, the controller 4 is configured to perform a PWM mode, a first detection mode, and a second detection mode, which would be described in detail as follows. Please refer to FIG. 4 in conjunction with FIG. 3. FIG. 4 schematically shows the first driving signal DR1, the second driving signal DR2, the first resonant signal RT1, the third driving signal DR3, the fourth driving signal DR4, and the second resonant signal RT2 of the inductive power supply 1*a* shown in FIG. 3. As shown in FIG. 3 and FIG. 4, in the PWM mode and the first detection mode, the operation of the first driving module 21 and the second driving module 22 and the corresponding waveform variation of the first driving signal DR1, second driving signal DR2, and first resonant signal RT1 are the same as that in the above-mentioned first embodiment, and thus detailed descriptions thereof are omitted herein. In addition, in the PWM mode and the first detection mode, the controller 4 controls the third switch circuit 231 and the fourth switch circuit 241 to operate normally through the third driving signal DR3 and the fourth driving signal DR4 respectively. Namely, the switches in the third switch circuit 231 and the fourth switch circuit 241 respectively switch according to the third driving signal DR3 and the fourth driving signal DR4. Further, the second resonant signal RT2 is generated by the resonance of the third capacitor C3, the fourth capacitor C4, and the power transmitting coil 20.

In the second detection mode, the controller 4 controls the first switch circuit 211, the second switch circuit 221, and the third switch circuit 231 to operate normally, and controls the fourth switch circuit 241 to remain in the off state. Since the first switch circuit 211, the second switch circuit 221, and the third switch circuit 231 operate normally, the power transmitting portion 2 continuously transmits power to the power receiving portion 3. In addition, since the fourth switch circuit 241 remains in the off state, the fourth capacitor C4 does not participate in the resonance, and thus the second resonant signal RT2 is generated by the resonance of the third capacitor C3 and the power transmitting coil 20 at this time.

When a metallic foreign object is present within the power transmission range of the power transmitting portion 2, the waveforms of the first resonant signal RT1 and the second resonant signal RT2 both exhibit rapid attenuation due to the influence of the metallic foreign object. Accordingly, according to the first resonant signal RT1 obtained in the first detection mode and the second resonant signal RT2 obtained in the second detection mode, the controller 4 can determine whether a metallic foreign object is present within the power transmission range of the power transmitting portion 2. Specifically, when the difference between two peak values in any two consecutive cycles of the first resonant signal RT1 in the first detection mode and the difference between two peak values in any two consecutive cycles of the second resonant signal RT2 in the second detection mode are both greater than a reference difference, the controller 4 determines that a metallic foreign object is present within the power transmission range of the power transmitting portion 2.

The circuit structure and operating principle of the third switch circuit 231 and the fourth switch circuit 241 are described in detail as follows.

Please refer to FIG. 3 again. The third switch circuit 231 includes a third upper switch Q3*a* and a third lower switch Q3*b* electrically connected in series. The third upper switch Q3*a* and the third lower switch Q3*b* are for example but not limited to N-channel enhancement mode MOSFETs. The gate and drain of the third upper switch Q3*a* are electrically connected to the third driver 232 and the power source 10, respectively. The source of the third upper switch Q3*a* is electrically connected to the drain of the third lower switch Q3*b*. The gate of the third lower switch Q3*b* is electrically connected to the third driver 232, and the source of the third lower switch Q3*b* is grounded. The first terminal of the third capacitor C3 is electrically connected to the source of the third upper switch Q3*a* and the drain of the third lower switch Q3*b*. The second terminal of the third capacitor C3 is electrically connected to the second node 20*b*.

The fourth switch circuit 241 includes a fourth upper switch Q4*a* and a fourth lower switch Q4*b* electrically connected in series. The fourth upper switch Q4*a* and the fourth lower switch Q4*b* are for example but not limited to N-channel enhancement mode MOSFETs. The gate and drain of the fourth upper switch Q4*a* are electrically connected to the fourth driver 242 and the power source 10, respectively. The source of the fourth upper switch Q4*a* is electrically connected to the drain of the fourth lower switch Q4*b*. The gate of the fourth lower switch Q4*b* is electrically connected to the fourth driver 242, and the source of the fourth lower switch Q4*b* is grounded. The first terminal of the fourth capacitor C4 is electrically connected to the source of the fourth upper switch Q4*a* and the drain of the fourth lower switch Q4*b*. The second terminal of the fourth capacitor C4 is electrically connected to the second node 20*b*.

When the third upper switch Q3*a* is turned on and the third lower switch Q3*b* is turned off, the third capacitor C3 is in a high potential state. When the third upper switch Q3*a* is turned off and the third lower switch Q3*b* is turned on, the third capacitor C3 is in a low potential state. When both the third upper switch Q3*a* and the third lower switch Q3*b* are turned off, the third capacitor C3 is in a high-impedance floating state. Similarly, when the fourth upper switch Q4*a* is turned on and the fourth lower switch Q4*b* is turned off, the fourth capacitor C4 is in a high potential state. When the fourth upper switch Q4*a* is turned off and the fourth lower switch Q4*b* is turned on, the fourth capacitor C4 is in a low potential state. When both the fourth upper switch Q4*a* and the fourth lower switch Q4*b* are turned off, the fourth capacitor C4 is in a high-impedance floating state.

Additionally, in the second detection mode, when the fourth switch circuit 241 is in the off state (i.e., when both the fourth upper switch Q4*a* and the fourth lower switch Q4*b* of the fourth switch circuit 241 are turned off), the fourth capacitor C4 and the fourth lower switch Q4*b* form a clamping circuit that clamps the second resonant signal RT2, which may result in current flowing back to the power source 10 from the second node 20*b*. For this reason, in an embodiment, the power transmitting portion 2 of the inductive power supply 1 further includes a second blocking switch P2. The second blocking switch P2 is electrically connected between the fourth upper switch Q4*a* and the power source 10, and is controlled by the controller 4. The second blocking switch P2 is configured to block the current from flowing back to the power source 10 from the second node 20*b*. In the embodiment shown in FIG. 3, the second blocking switch P2 is a P-channel MOSFET, but the present disclosure is not limited thereto. In another embodiment, the second blocking switch P2 may be a diode.

Please refer to FIG. 3 and FIG. 4. In the PWM mode, the controller 4 controls the first upper switch and first lower switch of each switch circuit to turn on alternately, and controls the first blocking switch P1 and the second blocking switch P2 to turn on. In the first detection mode, the controller 4 controls the first upper switch and first lower switch in each of the first switch circuit 211, the third switch circuit 231 and the fourth switch circuit 241 to turn on alternately, and controls the second upper switch Q2*a* and the second lower switch Q2*b* of the second switch circuit 221 to turn off. Further, the controller 4 controls the second blocking switch P2 to turn on, and controls the first blocking switch P1 to turn off to prevent reverse current. In the second detection mode, the controller 4 controls the first upper switch and first lower switch in each of the first switch circuit 211, the second switch circuit 221, and the third switch circuit 231 to turn on alternately, and controls the fourth upper switch Q4*a* and the fourth lower switch Q4*b* of the fourth switch circuit 241 to turn off. Further, the controller 4 controls the first blocking switch P1 to turn on, and controls the second blocking switch P2 to turn off to prevent reverse current.

In addition, similar to the second driving module 22, the number of fourth driving modules 24 is also not limited in the present disclosure. For example, in an embodiment, the inductive power supply 1 includes a plurality of fourth driving modules 24 electrically connected in parallel so as to improve the efficiency and power of power transmission. Moreover, in an embodiment, under the circumstance that the inductive power supply 1 includes a plurality of fourth driving modules 24, the inductive power supply 1 correspondingly includes a plurality of second blocking switches P2. Each second blocking switch P2 is electrically connected between the power source 10 and the corresponding fourth driving module 24, and is configured to prevent current from flowing back to the power source 10 through the corresponding fourth driving module 24.

Figure 5:
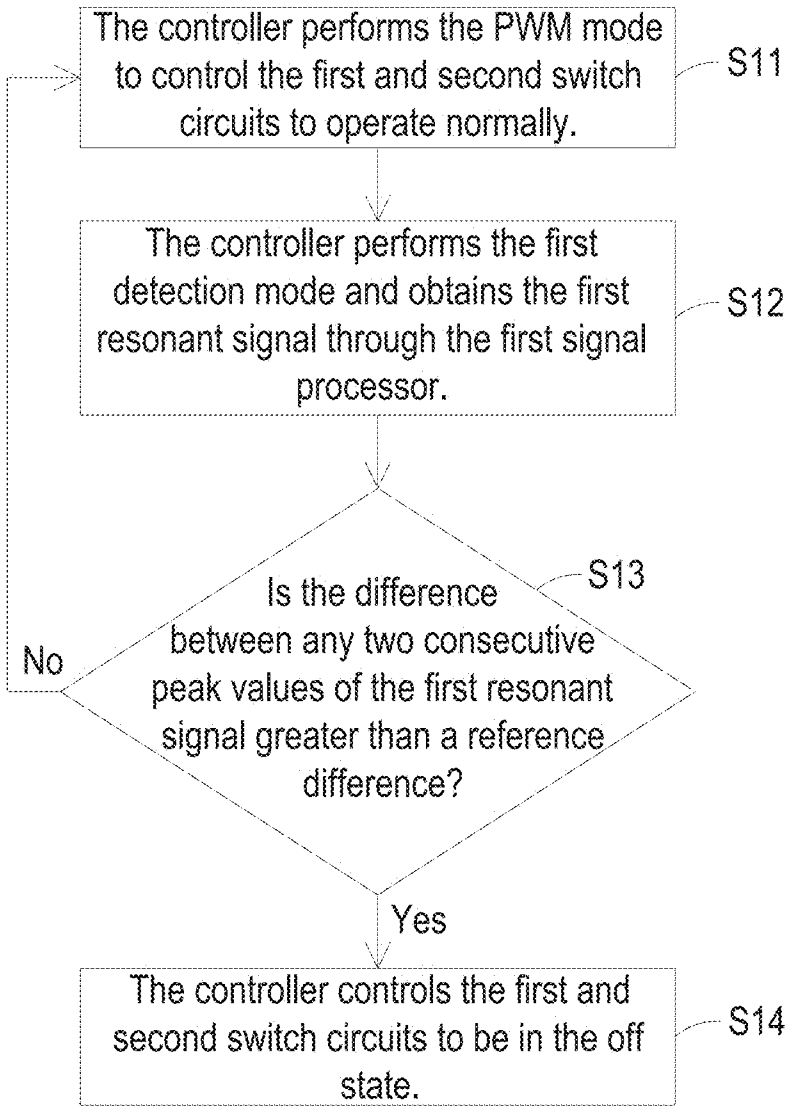
FIG. 5 is a schematic flow chart illustrating a metallic foreign object detection method of an inductive power supply according to an embodiment of the present disclosure.

FIG. 5 is a schematic flow chart illustrating a metallic foreign object detection method of an inductive power supply according to an embodiment of the present disclosure. The metallic foreign object detection method in this embodiment is applicable to the inductive power supply 1 in the first embodiment shown in FIG. 1. Please refer to FIG. 5 in conjunction with FIG. 1. In this embodiment, the metallic foreign object detection method includes steps S11, S12, S13 and S14.

In step S11, the controller 4 performs the PWM mode to control the first switch circuit 211 and the second switch circuit 221 to operate normally.

In step S12, the controller 4 performs the first detection mode and obtains the first resonant signal RT1, which is generated by the resonance of the first capacitor C1 and the power transmitting coil 20, through the first signal processor 5.

In step S13, the controller 4 determines whether the difference between two peak values in any two consecutive cycles of the first resonant signal RT1 is greater than a reference difference. If the determination result of step S13 is positive, the controller 4 determines that a metallic foreign object is present within the power transmission range of the power transmitting portion 2, and further performs the step S14 to control the first switch circuit 211 and the second switch circuit 221 to be in the off state. Conversely, if the determination result of step S13 is negative, the controller 4 determines that there is no metallic foreign object within the power transmission range of the power transmitting portion 2, and performs the step S11 again.

Figure 6:
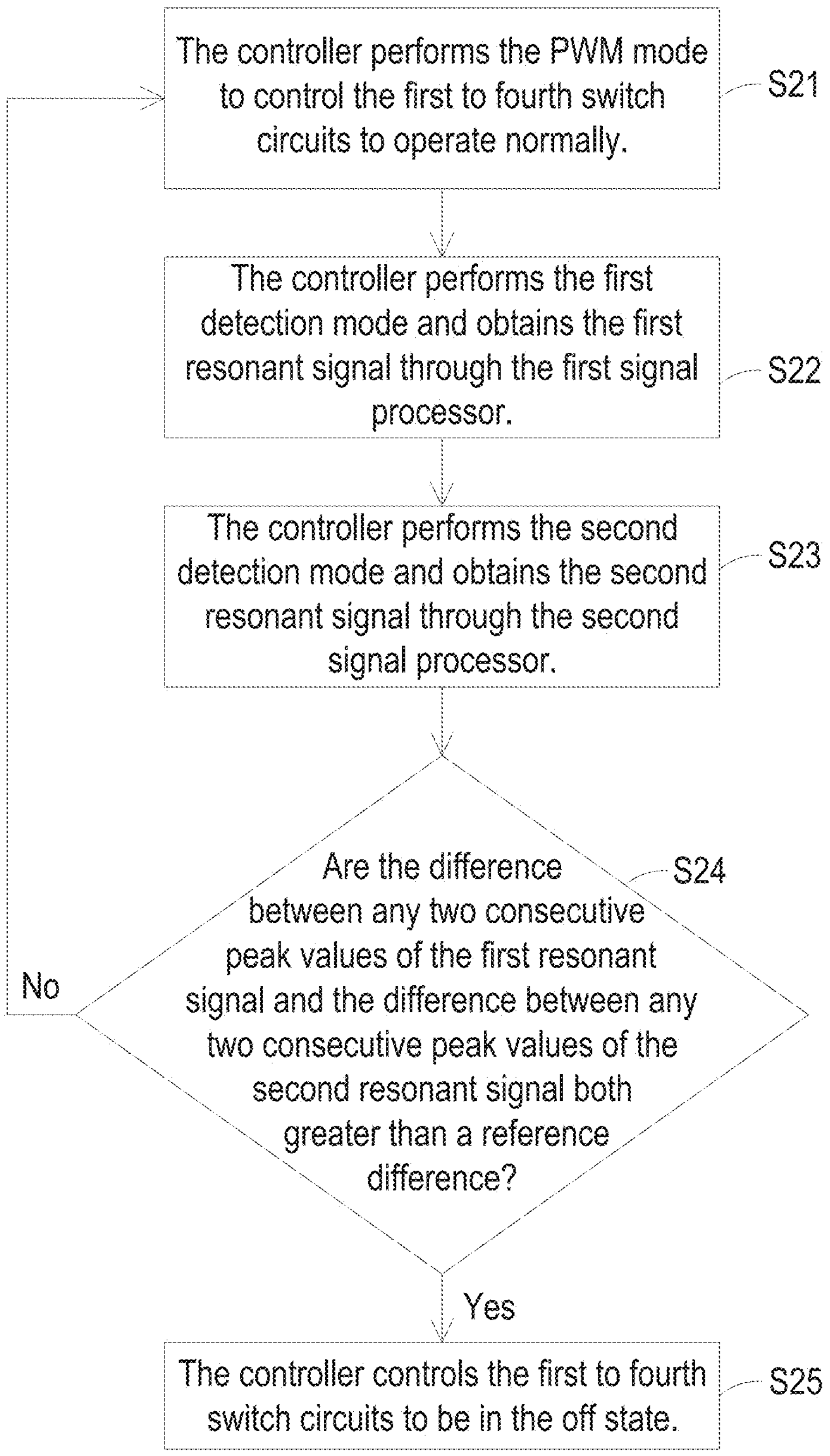
FIG. 6 is a schematic flow chart illustrating a metallic foreign object detection method of an inductive power supply according to another embodiment of the present disclosure.

FIG. 6 is a schematic flow chart illustrating a metallic foreign object detection method of an inductive power supply according to another embodiment of the present disclosure. The metallic foreign object detection method in this embodiment is applicable to the inductive power supply 1*a* in the second embodiment shown in FIG. 3. Please refer to FIG. 6 in conjunction with FIG. 3. In this embodiment, the metallic foreign object detection method includes steps S21, S22, S23, S24 and S25.

In step S21, the controller 4 performs the PWM mode to control the first switch circuit 211, the second switch circuit 221, the third switch circuit 231, and the fourth switch circuit 241 to operate normally.

In step S22, the controller 4 performs the first detection mode and obtains the first resonant signal RT1, which is generated by the resonance of the first capacitor C1 and the power transmitting coil 20, through the first signal processor 5.

In step S23, the controller 4 performs the second detection mode and obtains the second resonant signal RT2, which is generated by the resonance of the third capacitor C3 and the power transmitting coil 20, through the second signal processor 6.

In step S24, the controller 4 determines whether the difference between two peak values in any two consecutive cycles of the first resonant signal RT1 obtained in step S22 and the difference between two peak values in any two consecutive cycles of the second resonant signal RT2 obtained in step S23 are both greater than a reference difference. If the determination result of step S24 is positive, the controller 4 determines that a metallic foreign object is present within the power transmission range of the power transmitting portion 2, and further performs the step S25 to control the first switch circuit 211, the second switch circuit 221, the third switch circuit 231, and the fourth switch circuit 241 to be in the off state. Conversely, if the determination result of step S24 is negative, the controller 4 determines that there is no metallic foreign object within the power transmission range of the power transmitting portion 2, and performs the step S21 again.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An inductive power supply, comprising:

a power transmitting portion and a power receiving portion, wherein the power transmitting portion is connected to a power source and is configured to transmit power to the power receiving portion, and the power transmitting portion comprises:

a power transmitting coil, having a first node and a second node at two ends thereof respectively;

a first driving module, comprising a first capacitor, a first switch circuit and a first driver, wherein the first switch circuit is connected to the power source and is electrically connected between the first capacitor and the first driver, and the first capacitor is further electrically connected to the first node;

a second driving module, electrically connected in parallel to the first driving module, and comprising a second capacitor, a second switch circuit and a second driver, wherein the second switch circuit is connected to the power source and is electrically connected between the second capacitor and the second driver, and the second capacitor is further electrically connected to the first node;

a controller, electrically connected to the first driving module and the second driving module, and configured to provide a first driving signal and a second driving signal to the first driver and the second driver respectively, wherein the first driver is configured to drive the first switch circuit according to the first driving signal, and the second driver is configured to drive the second switch circuit according to the second driving signal; and a first signal processor, electrically connected to the first node and the controller, and configured to acquire a first resonant signal from the first node, wherein the controller is configured to perform a first detection mode, in which the controller drives the first switch circuit through the first driving signal, controls the second switch circuit to remain in an off state through the second driving signal, and obtains the first resonant signal generated by resonance of the first capacitor and the power transmitting coil through the first signal processor, wherein when a difference between any two consecutive peak values of the first resonant signal is greater than a reference difference, the controller is configured to determine that a metallic foreign object is present within a power transmission range of the power transmitting portion.

2. The inductive power supply according to claim 1, wherein the power transmitting portion further comprises a blocking switch electrically connected between the second switch circuit and the power source, and the controller is configured to control the blocking switch to turn off when performing the first detection mode.

3. The inductive power supply according to claim 1, wherein the first switch circuit comprises a first upper switch and a first lower switch electrically connected in series, a gate and a drain of the first upper switch are electrically connected to the first driver and the power source respectively, a source of the first upper switch is electrically connected to a drain of the first lower switch, a gate of the first lower switch is electrically connected to the first driver, a source of the first lower switch is grounded, a first terminal of the first capacitor is electrically connected to the source of the first upper switch and the drain of the first lower switch, and a second terminal of the first capacitor is electrically connected to the first node.

4. The inductive power supply according to claim 1, wherein the second switch circuit comprises a second upper switch and a second lower switch electrically connected in series, a gate and a drain of the second upper switch are electrically connected to the second driver and the power source respectively, a source of the second upper switch is electrically connected to a drain of the second lower switch, a gate of the second lower switch is electrically connected to the second driver, a source of the second lower switch is grounded, a first terminal of the second capacitor is electrically connected to the source of the second upper switch and the drain of the second lower switch, and a second terminal of the second capacitor is electrically connected to the first node.

5. The inductive power supply according to claim 1, wherein the power transmitting portion comprises a plurality of said second driving modules electrically connected in parallel.

6. The inductive power supply according to claim 1, wherein the power transmitting portion further comprises:

a third driving module, comprising a third capacitor, a third switch circuit and a third driver, wherein the third switch circuit is connected to the power source and is electrically connected between the third capacitor and the third driver, and the third capacitor is further electrically connected to the second node;

a fourth driving module, electrically connected in parallel to the third driving module, and comprising a fourth capacitor, a fourth switch circuit and a fourth driver, wherein the fourth switch circuit is connected to the power source and is electrically connected between the fourth capacitor and the fourth driver, and the fourth capacitor is further electrically connected to the second node; and a second signal processor, electrically connected to the second node and the controller, and configured to acquire a second resonant signal from the second node, wherein the controller is electrically connected to the third driving module and the fourth driving module and is configured to provide a third driving signal and a fourth driving signal to the third driver and the fourth driver respectively, the third driver is configured to drive the third switch circuit according to the third driving signal, and the fourth driver is configured to drive the fourth switch circuit according to the fourth driving signal, wherein the controller is further configured to perform a second detection mode, in which the controller drives the third switch circuit through the third driving signal, controls the fourth switch circuit to remain in the off state through the fourth driving signal, and obtains the second resonant signal generated by resonance of the third capacitor and the power transmitting coil through the second signal processor, wherein when the difference between any two consecutive peak values of the first resonant signal obtained in the first detection mode and a difference between any two consecutive peak values of the second resonant signal obtained in the second detection mode are both greater than the reference difference, the controller is configured to determine that the metallic foreign object is present within the power transmission range of the power transmitting portion.

7. The inductive power supply according to claim 6, wherein the power transmitting portion further comprises a first blocking switch and a second blocking switch; the first blocking switch is electrically connected between the second switch circuit and the power source, and the controller is configured to control the first blocking switch to turn off when performing the first detection mode; the second blocking switch is electrically connected between the fourth switch circuit and the power source, and the controller is configured to control the second blocking switch to turn off when performing the second detection mode.

8. The inductive power supply according to claim 6, wherein the third switch circuit comprises a third upper switch and a third lower switch electrically connected in series, a gate and a drain of the third upper switch are electrically connected to the third driver and the power source respectively, a source of the third upper switch is electrically connected to a drain of the third lower switch, a gate of the third lower switch is electrically connected to the third driver, a source of the third lower switch is grounded, a first terminal of the third capacitor is electrically connected to the source of the third upper switch and the drain of the third lower switch, and a second terminal of the third capacitor is electrically connected to the second node.

9. The inductive power supply according to claim 6, wherein the fourth switch circuit comprises a fourth upper switch and a fourth lower switch electrically connected in series, a gate and a drain of the fourth upper switch are electrically connected to the fourth driver and the power source respectively, a source of the fourth upper switch is electrically connected to a drain of the fourth lower switch, a gate of the fourth lower switch is electrically connected to the fourth driver, a source of the fourth lower switch is grounded, a first terminal of the fourth capacitor is electrically connected to the source of the fourth upper switch and the drain of the fourth lower switch, and a second terminal of the fourth capacitor is electrically connected to the second node.

10. The inductive power supply according to claim 6, wherein the power transmitting portion comprises a plurality of said second driving modules electrically connected in parallel and/or a plurality of said fourth driving modules electrically connected in parallel.

11. A metallic foreign object detection method of an inductive power supply, comprising steps of:

(a) providing a power transmitting portion and a power receiving portion, wherein the power transmitting portion is connected to a power source and is configured to transmit power to the power receiving portion, the power transmitting portion comprises a power transmitting coil, a first driving module, a second driving module, a controller and a first signal processor, the first driving module comprises a first capacitor, a first switch circuit and a first driver, the power transmitting coil has a first node and a second node at two ends thereof respectively, the first switch circuit is electrically connected to the power source and is electrically connected between the first capacitor and the first driver, the first capacitor is further electrically connected to the first node, the second driving module is electrically connected in parallel to the first driving module and comprises a second capacitor, a second switch circuit and a second driver, the second switch circuit is electrically connected to the power source and is electrically connected between the second capacitor and the second driver, the second capacitor is further electrically connected to the first node, the controller is electrically connected to the first and second driving modules, and the first signal processor is electrically connected to the first node and the controller and is configured to acquire a first resonant signal from the first node;

(b) providing a first driving signal and a second driving signal to the first driver and the second driver respectively by the controller, driving the first switch circuit according to the first driving signal by the first driver, and driving the second switch circuit according to the second driving signal by the second driver;

(c) controlling the controller to perform a first detection mode, in which the controller drives the first switch circuit through the first driving signal, controls the second switch circuit to remain in an off state through the second driving signal, and obtains the first resonant signal generated by resonance of the first capacitor and the power transmitting coil through the first signal processor; and (d) when a difference between any two consecutive peak values of the first resonant signal obtained in the first detection mode is greater than a reference difference, determining that a metallic foreign object is present within a power transmission range of the power transmitting portion by the controller.

12. The metallic foreign object detection method according to claim 11, wherein the power transmitting portion further comprises a blocking switch electrically connected between the second switch circuit and the power source, and in the step (c), the controller controls the blocking switch to turn off when performing the first detection mode.

13. The metallic foreign object detection method according to claim 11, wherein in the step (a), the power transmitting portion further comprises a third driving module, a fourth driving module and a second signal processor, the third driving module comprises a third capacitor, a third switch circuit and a third driver, the third switch circuit is electrically connected to the power source and is electrically connected between the third capacitor and the third driver, the third capacitor is further electrically connected to the second node, the fourth driving module is electrically connected in parallel to the third driving module and comprises a fourth capacitor, a fourth switch circuit and a fourth driver, the fourth switch circuit is electrically connected to the power source and is electrically connected between the fourth capacitor and the fourth driver, the fourth capacitor is further electrically connected to the second node, the controller is electrically connected to the third driving module and the fourth driving module, and the second signal processor is electrically connected to the second node and the controller and is configured to acquire a second resonant signal from the second node;

the metallic foreign object detection method further comprising a step of:

(e) providing a third driving signal and a fourth driving signal to the third driver and the fourth driver respectively by the controller, driving the third switch circuit according to the third driving signal by the third driver, and driving the fourth switch circuit according to the fourth driving signal by the fourth driver.

14. The metallic foreign object detection method according to claim 13, further comprising a step of:

(f) controlling the controller to perform a second detection mode, in which the controller drives the third switch circuit through the third driving signal, controls the fourth switch circuit to remain in the off state through the fourth driving signal, and obtains the second resonant signal generated by resonance of the third capacitor and the power transmitting coil through the second signal processor.

15. The metallic foreign object detection method according to claim 14, wherein in the step (d), when the difference between any two consecutive peak values of the first resonant signal obtained in the first detection mode and a difference between any two consecutive peak values of the second resonant signal obtained in the second detection mode are both greater than the reference difference, determining that the metallic foreign object is present within the power transmission range of the power transmitting portion by the controller.

16. The metallic foreign object detection method according to claim 14, wherein the power transmitting portion further comprises a first blocking switch and a second blocking switch, the first blocking switch is electrically connected between the second switch circuit and the power source, and the second blocking switch is electrically connected between the fourth switch circuit and the power source; in the step (c), the controller controls the first blocking switch to turn off when performing the first detection mode; in the step (f), the controller controls the second blocking switch to turn off when performing the second detection mode.

* * * * *